US 12,423,870 B2

(12) United States Patent
Griffin

(10) Patent No.: US 12,423,870 B2
(45) Date of Patent: *Sep. 23, 2025

(54) METHOD AND APPARATUS FOR EVALUATING THE COMPOSITION OF PIGMENT IN A COATING BASED ON AN IMAGE

(71) Applicant: Insight Direct USA, Inc., Chandler, AZ (US)

(72) Inventor: Michael Griffin, Wayland, MA (US)

(73) Assignee: Insight Direct USA, Inc., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/748,897

(22) Filed: Jun. 20, 2024

(65) Prior Publication Data

US 2024/0338853 A1 Oct. 10, 2024

Related U.S. Application Data

(63) Continuation of application No. 17/518,208, filed on Nov. 3, 2021, now Pat. No. 12,039,759.

(60) Provisional application No. 63/230,485, filed on Aug. 6, 2021.

(51) Int. Cl.
*G06K 9/00* (2022.01)
*C09D 7/80* (2018.01)
*G06F 18/23* (2023.01)
*G06T 7/00* (2017.01)
*G06T 7/90* (2017.01)

(52) U.S. Cl.
CPC .............. *G06T 7/90* (2017.01); *C09D 7/80* (2018.01); *G06F 18/23* (2023.01); *G06T 7/001* (2013.01); *G06T 2207/10024* (2013.01); *G06T 2207/20081* (2013.01); *G06T 2207/30108* (2013.01)

(58) Field of Classification Search
CPC . G06T 7/90; G06T 7/001; G06T 2207/10024; G06T 2207/10056; G06T 2207/10061; G06T 2207/20081; G06T 2207/20084; G06T 2207/30108; G06T 2207/30144; G06T 2207/30156; G06F 18/23; G06F 16/55; G06F 16/5838; G06V 10/40; G06V 10/56; G06V 30/18105; C09D 7/80
See application file for complete search history.

(56) References Cited

U.S. PATENT DOCUMENTS

| | | | |
|---|---|---|---|
| 12,039,759 B2 * | 7/2024 | Griffin | G06F 18/23 |
| 2022/0138986 A1 | 5/2022 | Wei | |
| 2022/0267619 A1 | 8/2022 | Kroehl et al. | |
| 2023/0221182 A1 | 7/2023 | Baughman et al. | |

* cited by examiner

*Primary Examiner* — Duy M Dang
(74) *Attorney, Agent, or Firm* — Kinney & Lange, P.A.

(57) ABSTRACT

A coating analyzer is configured to receive electronic image data of a physical coating and to generate information regarding the pigments of the physical coating. The coating analyzer applies a computer vision model trained on baseline image data to the electronic image data. The coating analyzer assigns color values to the pigments forming the electronic image data and generates pigment groups based on the assigned color values. The pigment groups provide color palette data regarding the pigments forming the coating.

20 Claims, 4 Drawing Sheets

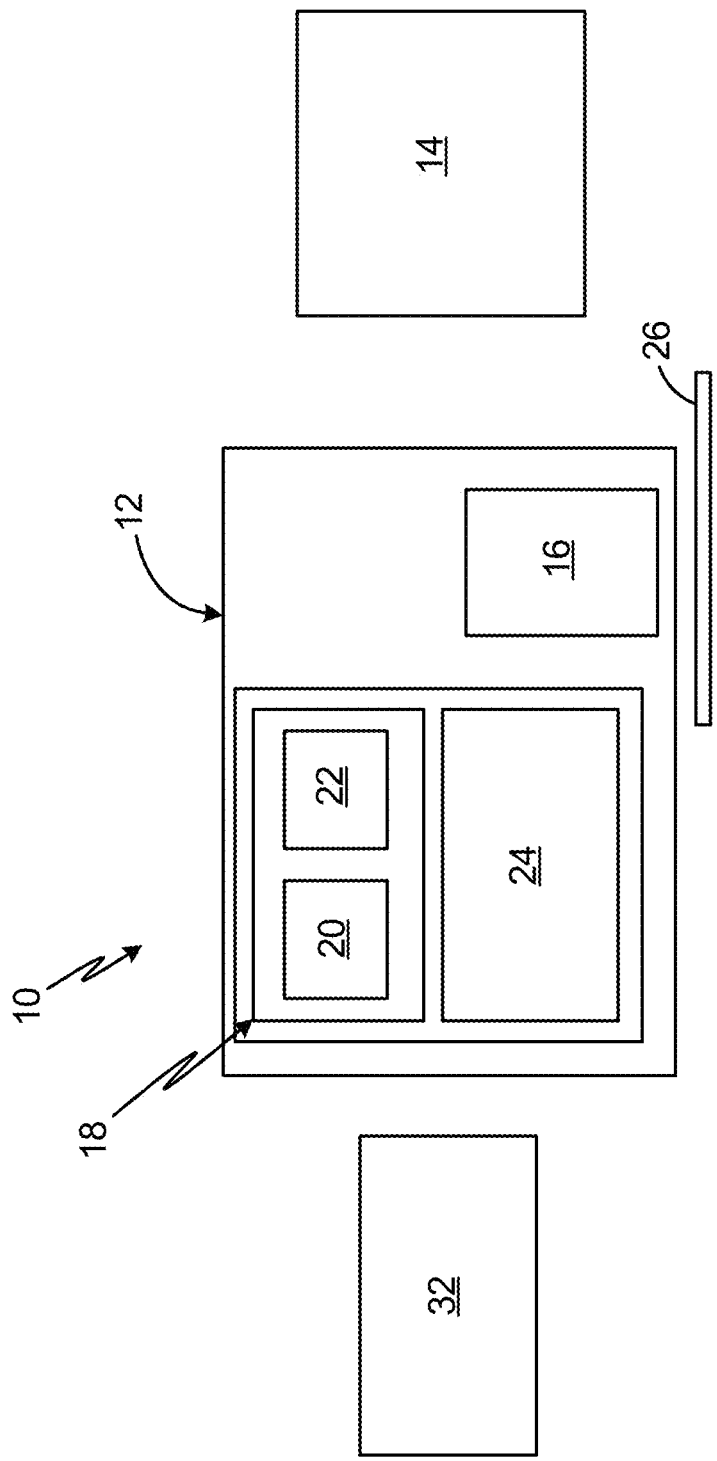

METHOD AND APPARATUS FOR EVALUATING THE COMPOSITION OF PIGMENT IN A COATING BASED ON AN IMAGE

CROSS-REFERENCE TO RELATED APPLICATIONS

This application is a continuation of U.S. application Ser. No. 17/518,208, filed Nov. 3, 2021, and entitled "METHOD FOR DETERMINING THE TYPES AND AMOUNTS OF PAINT PIGMENTS IN AN IMAGE," which in turn claims priority to U.S. Provisional Application No. 63/230,485, filed Aug. 6, 2021, and entitled "METHOD FOR DETERMINING THE TYPES AND AMOUNTS OF PAINT PIGMENTS IN AN IMAGE," the disclosures of which are hereby incorporated by reference in their entireties.

BACKGROUND

This disclosure relates generally to coating identification. More specifically, this disclosure relates to identification of colors and pigments forming a coating.

Paint manufacturers are often asked to replicate a paint in order to repair damaged painted surfaces. Some paints can be replicated utilizing a spectrophotometer to determine the wavelength of the hue of that paint on the visible spectrum. Such a device provides the wavelength of the paint color on the visible spectrum, but that information does not allow for direct production of high-quality paints. Coatings that contain flake (e.g., metallic) and other various pigment can have an exact color match on the visible spectrum, but the actual visual appearance will be unappealing due to mismatched pigments and/or flake size. Paints appear darker with coarser flake, while the same color paint appears lighter with finer flake.

Most high-quality paints contain a mixture of anywhere from 1 to 50 or more pigments. Manufacturers (such as automotive manufacturers) can each have hundreds or thousands of different paints that provide different hues and tones. Such diversity of paint can lead to hundreds of thousands of individual combinations with only one direct match to the coating of interest. The multitude of variations and shades of paint make finding an exact original manufacturer match difficult, if not impossible. Even if an exact match is found, the actual color being matched may not be visibly identical to the original manufacturer's paint, due to wear and tear, weathering, and other aging of the paint sample being matched. Identifying each pigment and the concentration of each pigment forming the paint is required to replicate the paint. This process involves taking very high resolution images at the microscopic level and having a highly trained "colorist" use a microscope to painstakingly identify each pigment while quantifying the concentration of each pigment within the paint sample. This process can take months to complete for a single paint.

SUMMARY

According to one aspect of the disclosure, a method of identifying components of a coating of interest includes obtaining electronic image data of a physical coating; identifying, by a coating analyzer, one or more pigments of the physical coating based on the electronic image data and by a pigmentation computer vision model trained on baseline image data corresponding to physical pigmentation of physical coatings to generate respective color palette data for each respective pigment of the one or more pigments; comparing, by the coating analyzer, the respective color palette data with reference color palette data; correlating, by the coating analyzer, each pigment of the one or more pigments with a respective reference pigment based on the comparison between the respective color palette data and the reference color palette data to generate pigmentation information regarding each pigment of the one or more pigments; and outputting, by the coating analyzer, the generated pigmentation information.

According to an additional or alternative aspect of the disclosure, a coating analyzer configured to generate pigmentation information regarding a coating of interest. The coating analyzer includes control circuitry; and memory encoded with instructions that, when executed by the processor, cause the coating analyzer to identify one or more pigments of the physical coating based on the electronic image data and by a pigmentation computer vision model trained on baseline image data corresponding to physical pigmentation of physical coatings to generate respective color palette data for each respective pigment of the one or more pigments; compare the respective color palette data with reference color palette data; correlate each pigment of the one or more pigments with a respective reference pigment based on the comparison between the respective color palette data and the reference color palette data to generate pigmentation information regarding each pigment of the one or more pigments; and output the generated pigmentation information.

BRIEF DESCRIPTION OF THE DRAWINGS

FIG. 1 is a block diagram of a coating identification and replication system.

DETAILED DESCRIPTION

Figure 2A:
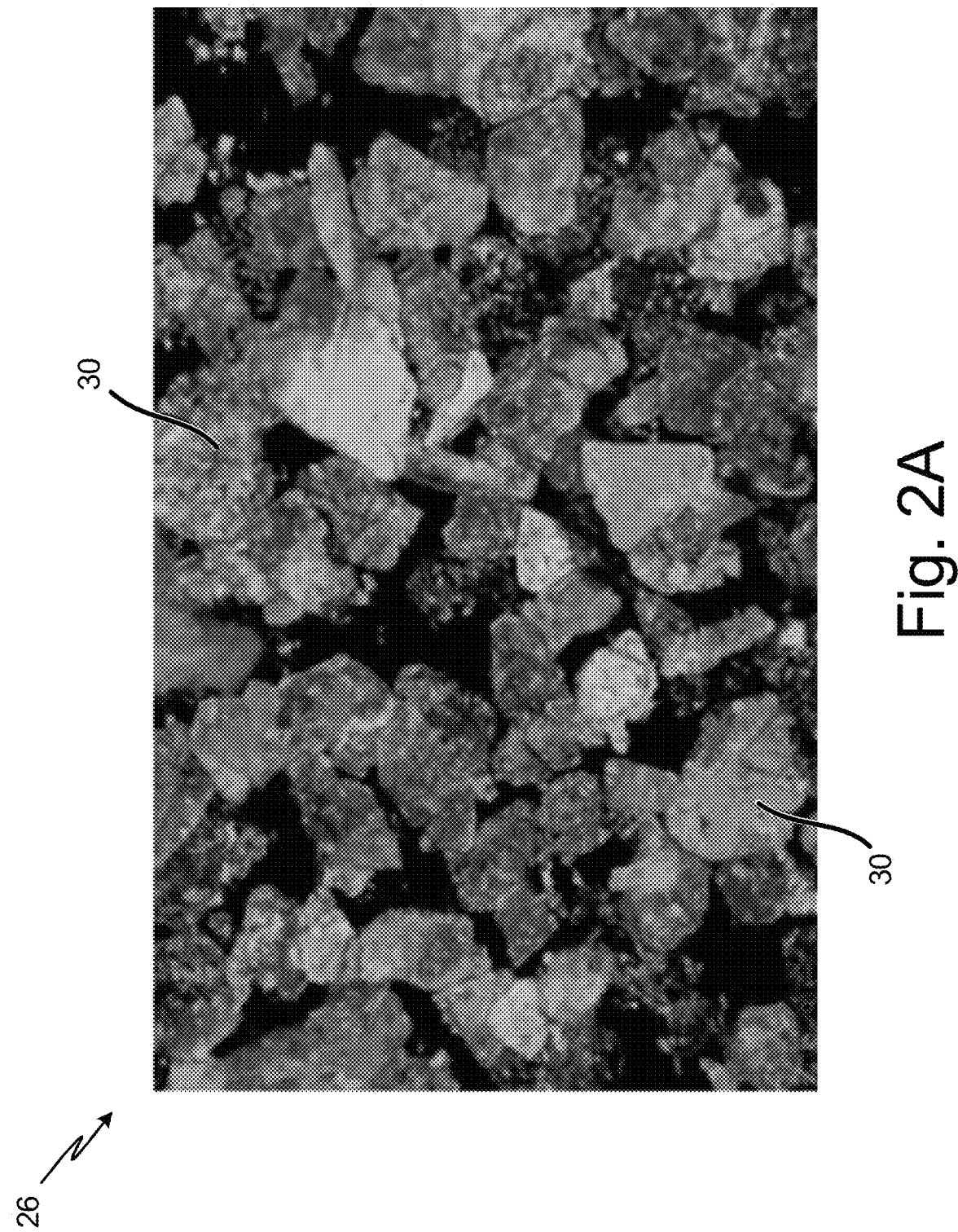
FIG. 2A is an illustration of an electronic image of a paint sample, in which a plurality of different pigments are present and visible.

The present disclosure combines machine learning techniques with image processing techniques in a software solution. The software solution can automatically identify all paint pigments based on electronic images and quantify the concentrations of such pigments. Images are read into the computer program. A machine learning algorithm is used to automatically identify groups of pixels associated with pigments using no other information than that contained in the electronic image. For each pigment identified, the software determines the percentage or concentration of that pigment in the image. The pigmentation information can be displayed, printed for use, and/or provided to a coating mixer to generate the desired coating. The pigmentation information is generated based on a single electronic image of the coating of interest provided to the machine learning algorithm.

FIG. 1 is a block diagram of a coating identification and replication (CIR) system 10. CIR system 10 includes correlator 12 and mixer 14. Correlator 12 includes image-capture device 16 and coating analyzer 18. Control circuitry 20, memory 22, and user interface 24 of coating analyzer 18 are shown. As is further illustrated in FIG. 1, CIR system 10 can also include (or otherwise be associated with) reference database 32.

CIR system 10 is a system configured to generate pigmentation information regarding a coating of interest (e.g., a paint), such as coating 26 and/or generate pigmentation information regarding component parts of the coating 26 (e.g., regarding the pigments of coating 26). While paint is used herein as an exemplar, it is understood that CIR system 10 can be configured to identify and, in some examples, replicate pigment information for any desired substance formed by one or more particulates. For example, CIR system 10 can be configured to generate pigmentation information regarding a hue of paint. In some examples, CIR system 10 can positively identify the one or more pigments that together form the hue of the paint. Each pigment is formed by one or more colors that together define the color palette of that pigment. CIR system 10 can further generate information regarding the size and distribution of the particulate (e.g., pigment, metallic flake, etc.) forming the coating 26, which information can be referred to as spacing information. Such spacing information facilitates precise reproduction of the coating of interest, particularly in examples utilizing metallic paints within which the size of the metallic flake directly affects the visual appearance of the paint.

CIR system 10 is configured to generate pigmentation information regarding coatings of interest. The perceived color composition of the coating 26, which is the coating of interest in the examples discussed, is based on the concentration and type of the pigments added to a base to form that coating 26. The pigmentation information can include the color composition of the coating, the identities of one or more pigments forming the coating (e.g., color palette data), and an identity of one or more coatings corresponding to the coating of interest, among other information regarding the coating of interest.

Correlator 12 is configured to generate electronic image data regarding coating 26 (e.g., by image-capture device 16) and to generate and, in some examples, output the pigmentation information (e.g., by coating analyzer 18). For example, correlator 12 can generate pigmentation information regarding the pigments forming coating 26 and/or regarding coating 26 itself. Correlator 12 can recall reference information (e.g., color information regarding physical pigments and/or physical coatings) from reference database 32 and compare the pigmentation information generated by correlator 12 and the reference information to identify the coating of interest and/or pigments forming the coating of interest.

Image-capture device 16 is configured to generate the electronic image data regarding coating 26. For example, image-capture device 16 can be configured to generate two-dimensional digital images of coating 26. Image-capture device 16 is configured to generate the electronic image data at scale sufficient to show the colorants or pigments that were mixed to form coating 26. Image-capture device 16 can be an optical device, such as a camera, configured to generate the image data. The electronic image data is colorized. The electronic image data can include colorized two-dimensional images. In some examples, image-capture device 16 is configured to generate microscopic images showing the pigments. Image-capture device 16 can generate pigmentation data regardless of the image scale, so long as the particles forming the pigments are visible. Coating analyzer 18 is configured to generate the pigmentation information based on the electronic image data. The electronic image data can be in the form of a single image. It is understood that, while the electronic image data is formed as a single image, in some examples the single image can be itself formed by an aggregation of multiple images that together form the single image.

Coating analyzer 18, which can also be referred to as a computing device, is configured to determine the composition of coating 26 based on the electronic image data. Coating analyzer 18 is configured to generate pigmentation data regarding the coating of interest, which can be and/or include color palette data reading the one or more pigments forming coating 26. For example, coating analyzer 18 can be configured to generate a count of the pigments forming coating 26, to positively identify each of the one or more pigments and/or to generate color palette data regarding the one or more pigments, among other options. The color palette data can form part or all of the pigmentation data. For example, coating analyzer 18 can generate color palette data such as by identifying discrete colors forming the pigment, generating color values for the discrete colors and/or the pigment, determining percentage concentrations of the discrete colors within a pigment and/or of a pigment within coating 26, among other options.

Coating analyzer 18 is configured to generate data and information regarding coating 26, pigments of coating 26, and/or discrete colors forming the pigments and/or coating based on the electronic image data generated by image-capture device 16. Coating analyzer 18 is configured to store software, implement functionality, and/or process instructions. Coating analyzer 18 can be of any suitable configuration for gathering data, processing data, etc. Coating analyzer 18 can receive inputs, provide outputs, determine coating compositions based on electronic image data, and output information regarding the composition. Coating analyzer 18 can be configured to receive inputs and/or provide outputs via user interface 24. Coating analyzer 18 can include hardware, firmware, and/or stored software, and coating analyzer 18 can be entirely or partially mounted on one or more circuit boards.

While coating analyzer 18 is shown as a discrete assembly, it is understood that coating analyzer 18 can be formed by one or more devices capable of individually or collectively implementing functionalities and generating and outputting data as discussed herein. Coating analyzer 18 can be considered to form a single computing device even when distributed across multiple component devices. Coating analyzer 18 is configured to perform any of the functions attributed herein to coating analyzer 18, including receiving an output from any source referenced herein, detecting any condition or event referenced herein, and generating and providing data and information as referenced herein. Coating analyzer 18 can be of any type suitable for operating in accordance with the techniques described herein. In some examples, coating analyzer 18 can be implemented as a plurality of discrete circuitry subassemblies. In some examples, coating analyzer 18 can include a smartphone or tablet, among other options.

Control circuitry 20, in one example, is configured to implement functionality and/or process instructions. For example, control circuitry 20 can be capable of processing instructions stored in memory 22. Examples of control circuitry 20 can include one or more of a processor, a microprocessor, a controller, a digital signal processor (DSP), an application specific integrated circuit (ASIC), a field-programmable gate array (FPGA), or other equivalent discrete or integrated logic circuitry. Control circuitry 20 can be entirely or partially mounted on one or more circuit boards.

Coating analyzer 18 is operably associated with image-capture device 16 to receive the image data from image-capture device 16. Coating analyzer 18 can be communicatively coupled to image-capture device 16 in any desired manner, either directly or indirectly. In some examples, coating analyzer 18 can include communications circuitry configured to facilitate wired or wireless communications. For example, the communications circuitry can facilitate radio frequency communications and/or can facilitate communications over a network, such as a local area network, wide area network, cellular network, and/or the Internet. In some examples, coating analyzer 18 can be directly communicatively coupled to image-capture device 16 to receive the electronic image data directly from image-capture device 16, via wired or wireless connections, or both. In some examples, coating analyzer 18 can be indirectly communicatively coupled to image-capture device 16 via one or more intermediate devices to receive the electronic image data. The electronic image data can be transmitted to and stored on an intermediary device prior to being provided to coating analyzer 18, yet such electronic image data is still considered to be received by coating analyzer 18 from image-capture device 16. For example, both image-capture device 16 and coating analyzer 18 can be communicatively coupled via the cloud or a central server, among other options.

Memory 22 can be configured to store information before, during, and/or after operation. Memory 22, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 22 is a temporary memory, meaning that a primary purpose of memory 22 is not long-term storage. Memory 22, in some examples, is described as volatile memory, meaning that memory 22 does not maintain stored contents when power to coating analyzer 18 is turned off. Examples of volatile memories can include random access memories (RAM), dynamic random access memories (DRAM), static random access memories (SRAM), and other forms of volatile memories. In some examples, memory 22 is used to store program instructions for execution by control circuitry 20. Memory 22, in one example, is used by software or applications running on coating analyzer 18 to temporarily store information during program execution.

Memory 22, in some examples, also includes one or more computer-readable storage media. Memory 22 can be configured to store larger amounts of information than volatile memory. Memory 22 can further be configured for long-term storage of information. In some examples, memory 22 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 24 can be configured as an input and/or output device. For example, user interface 24 can be configured to receive inputs from a data source and/or provide outputs regarding identification information. Examples of user interface 24 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

In some examples, coating analyzer 18 is configured to implement computer-readable instructions that can take the form of a computer vision (CV) or machine vision model that utilizes machine learning to analyze, understand, and/or respond to digital images or video. The CV model applied by coating analyzer 18 can be referred to as a pigmentation computer vision model. The application of machine learning algorithms to input from image-capture device 16 can enable visual information to be converted into data that can be processed and evaluated for patterns. By analyzing a selection of images, machine learning models (e.g., neural networks among other options) can be trained to recognize, classify and react to the image data. Retraining of the neural network or other machine learning model to account for aspects such as changing environmental conditions (e.g., lighting changes, coating age, different environmental conditions that the coating was stored in, etc.) can increase accuracy and reliability of the resulting output from the model.

The computer vision or machine vision model can be trained on baseline image data corresponding to one or more training pigments and one or more training coatings. For example, the computer vision model can be trained on baseline image data corresponding to physical pigments and/or physical pigmentation of physical coatings. Coating analyzer 18 can be configured to implement unsupervised learning algorithms to analyze, understand, and/or respond to the image data. Unsupervised learning is a type of machine learning in which the algorithm is not provided with any pre-assigned labels or scores for the training data. The unsupervised learning algorithm must self-discover any naturally occurring patterns in the training data set. For example, coating analyzer 18 can be configured to utilize a clustering algorithm to generate pigmentation data regarding the coating of interest. The clustering algorithm can automatically group training examples into categories of similar features. For example, coating analyzer 18 can implement a clustering algorithm based on coloration data (e.g., discrete color values) regarding the pixels forming the electronic image data. Coating analyzer 18 can group the various pixels into clusters based, in some examples and at least in part, on the color values for each pixel, which color values are generated by coating analyzer 18 and assigned to the pixels.

Color values assign numerical values to colors as tuples (e.g., triples in RGB (based on red, green, blue) and quadruples in CMYK (based on cyan, magenta, yellow, black)). A color model represents the way various colors are represented as tuples. Coating analyzer 18 can be configured to generate data based on any desired color model (e.g., RGB; CMY (based on cyan, magenta, yellow); CMYK; etc.).

Coating analyzer 18 can determine color values for each pixel and assign the determined color values to the pixels. The pixels that have been assigned color values by coating analyzer 18 can be referred to as evaluated pixels. In some examples, coating analyzer 18 groups the evaluated pixels based on the coloration data, such as by a clustering algorithm. For example, evaluated pixels can be grouped based on the distances between the assigned color values for each evaluated pixel within a color space. A color space is a combination of the color model and a mapping function. For example, the evaluated pixels can be grouped based on a distance between the evaluated pixels within the color space (e.g., based on a Euclidean distance). It is understood that coating analyzer 18 can be configured based on any desired color space.

Different automotive manufacturers utilize different pigments having differing hues and tones to generate various paints. The paints can be assigned codes to identify the paint, but the actual color values (e.g., the tuple) can be different even for the same paint due to different manufacturers utilizing different color spaces. Reference database 32 can include identifying information regarding various pigments and/or coatings. For example, the reference database 32 can include formula information regarding various coatings, can include pigmentation information regarding various pigments, can identify the relevant color model and color space, etc. Coating analyzer 18 can be operably (e.g., communicatively) connected to reference database 32 (FIG. 1), though it should be understood that in other examples, coating analyzer 18 can include reference database 32. Reference database 32 can be an electronic database, such as a relational database, a multi-dimensional database, or other type of electronic database capable of storing information in an organized manner for later retrieval of the information. Coating analyzer 18 can be configured to generate data based on multiple color models and across multiple color spaces. Coating analyzer 18 can be configured to determine a best fit between coating 26 and a reference coating (e.g., recalled from reference database 32) within the multiple color models and color spaces based on the generated data.

CIR system 10 can be configured to replicate the coating of interest. For example, CIR system 10 can utilize the pigmentation information to generate new paint ready for application to the desired substrate. Mixer 14 can be configured as and/or include a paint mixer that mixes a paint, or other coating, according to the formula generated by coating analyzer 18. For example, mixer 14 can be connected to sources of pigment and configured to automatically combine the pigments with a paint base according to the ratios determined by coating analyzer 18 to form the desired mixture. Additionally or alternatively, CIR system 10 can be configured to generate and output the formula for reproducing the paint, and a user or other system can utilize that information to reproduce the paint. While CIR system 10 is shown as a discrete assembly, it is understood that CIR system 10 can be formed by one or more devices or subsystems capable of individually or collectively implementing functionalities and generating and outputting data as discussed herein. For example, mixer 14 can be disposed remote from and communicatively connected, directly or indirectly (e.g., via an intermediary device), to coating analyzer 18; image-capture device 16 can be disposed remote from and communicatively coupled, directly or indirectly, to coating analyzer 18; etc.

Figure 2B:
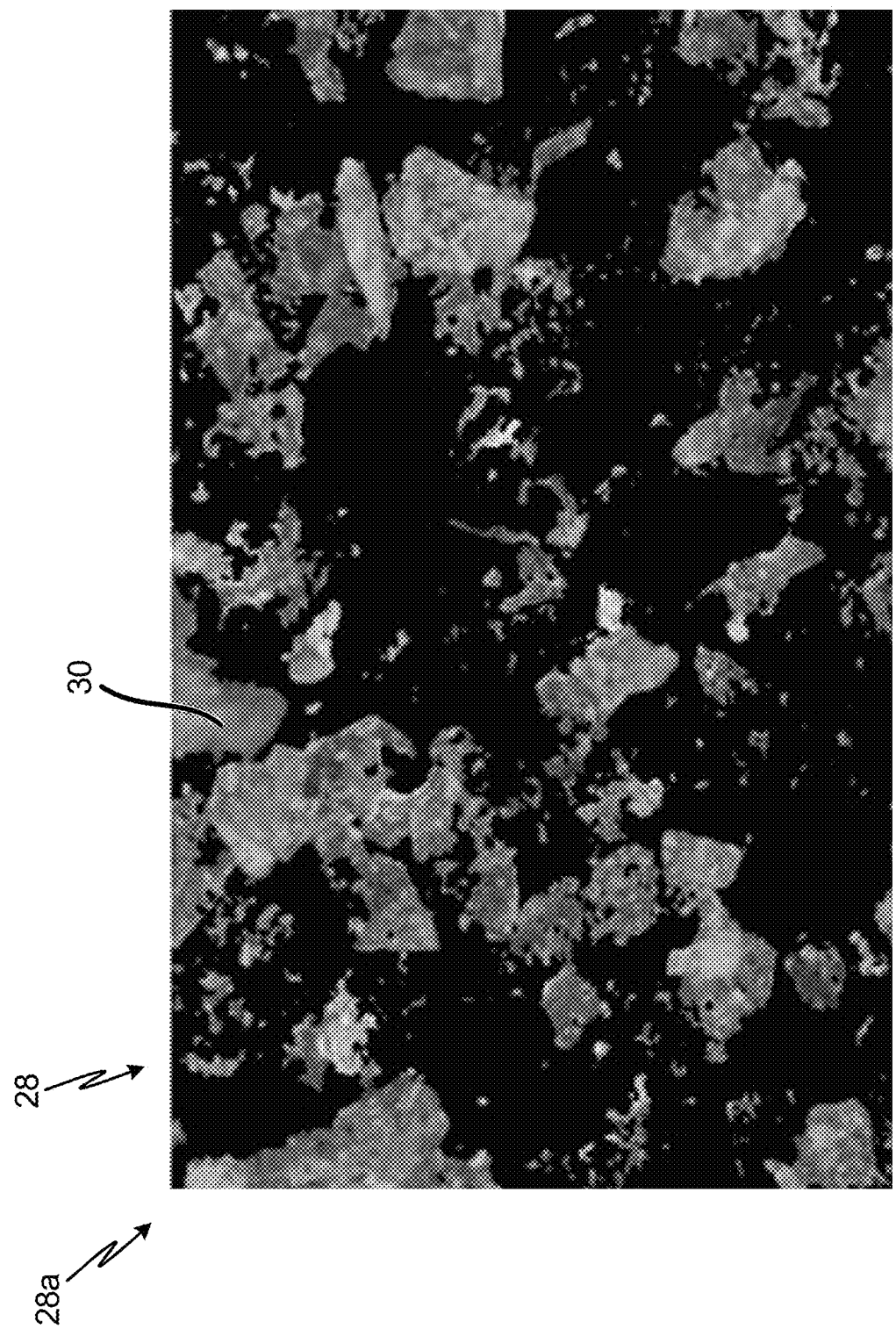
FIG. 2B illustrates the isolation of a first pigment from the electronic image shown in FIG. 2A.
Figure 2C:
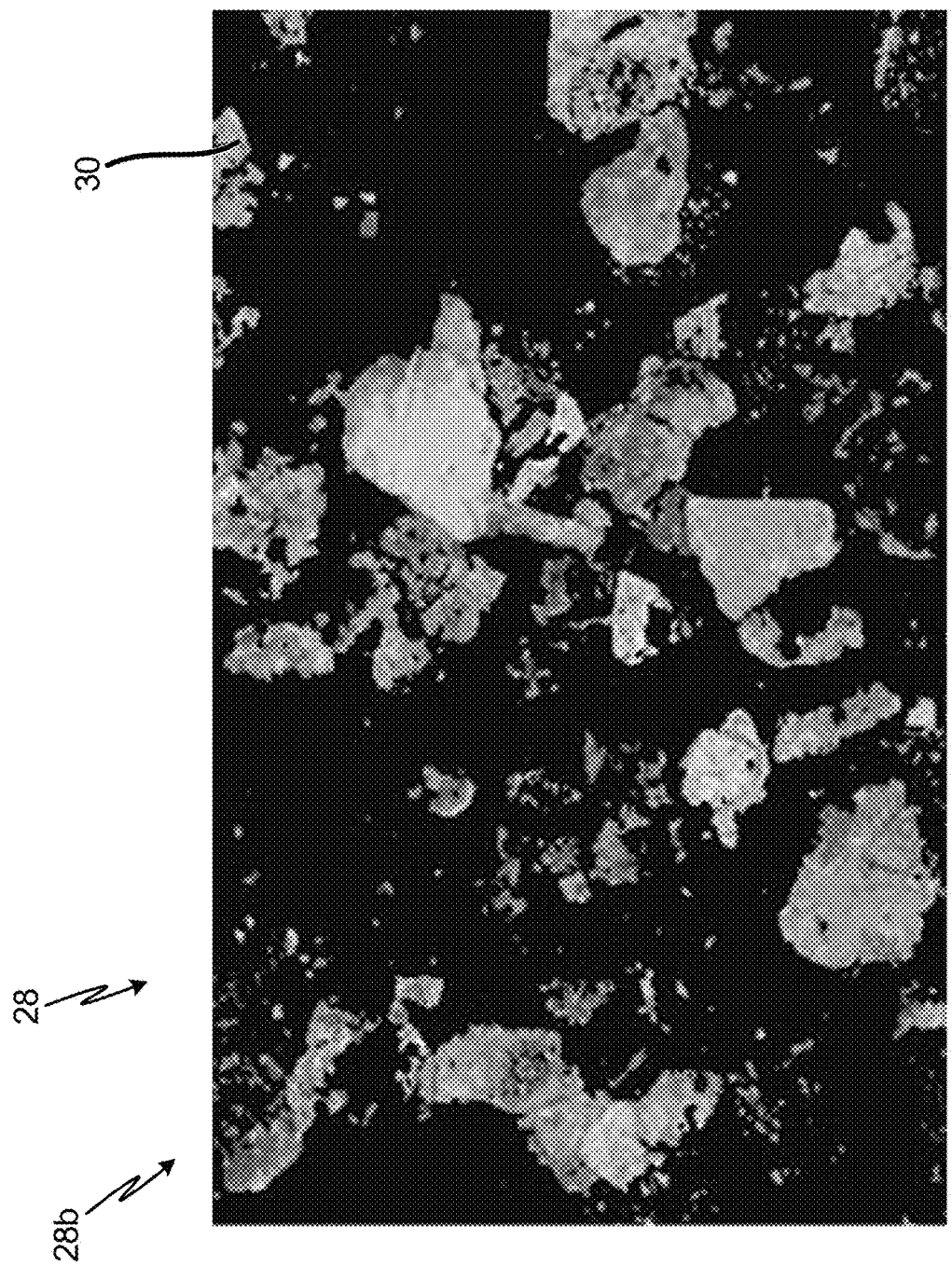
FIG. 2C illustrates the isolation of a second pigment from the electronic image shown in FIG. 2A.

FIG. 2A illustrates an electronic image of coating 26. FIG. 2B illustrates an electronic image of coating 26 showing first pigment 28a in isolation. FIG. 2C is an electronic image of coating 26 showing second pigment 28b in isolation. Pigments 28a, 28b can be referred to collectively herein as "pigment 28" or "pigments 28". FIGS. 2A-2C will be discussed together and with continued reference to FIG. 1. Each pigment 28a, 28b is formed by particulate 30, such as a powder, flake, etc.

The electronic image shown in FIG. 2A is representative of electronic image data generated by image-capture device 16. Coating 26 is the coating of interest in the example discussed herein. The electronic image data is a two-dimensional image in color and is generated at a scale sufficient to show the particulate 30 of pigments 28a, 28b. A plurality of different pigments are present and visible in the electronic image data. The machine learning algorithm of image-capture device 16 is applied to the electronic image data to identify the different pigments 28 forming coating 26, to quantify the percentage of the image occupied by each pigment, and/or to produce the color palette of each pigment 28 and/or of the coating 26. The machine learning algorithm can also take additional information into account to identify the pigment composition of the coating 26, including comparing the identified pigments 28a, 28b to known pigment color palettes and/or pigment images and following rules relating to the number of pigments 28 that can be identified for a coating, for example.

Image-capture device 16 generates the electronic image data as shown in FIG. 2A. The single image contained in the electronic image data is provided to coating analyzer 18. Coating analyzer 18 analyzes the electronic image data (e.g., by a machine learning algorithm, such as a machine learning algorithm based on clustering, among other machine learning options) and generates pigmentation data.

Coating analyzer 18 can generate the pigmentation data based on a count of the pigments present in the electronic image data. In some examples, coating analyzer 18 can conduct a first pigment classification based on a base pigment count. The base pigment count is the number of pigments 28 that coating analyzer 18 determines as forming coating 26 and such base pigment count can form at least a part of the initial pigmentation data.

The base pigment count can be generated by the machine learning algorithm implemented by coating analyzer 18 (e.g., based on cluster analysis and a number of clusters output by the machine learning algorithm). In some examples, the base pigment count is based on a composition threshold, in that coating analyzer 18 can be configured to classify a pixel grouping as forming a pigment if the pixel grouping meets or exceeds the composition threshold. For example, the composition threshold can be one percent, two percent, three percent, five percent, ten percent, or another percentage of coating 26. As such, a cluster can be classified as itself forming a pigment when the identified cluster meets or exceeds the composition threshold.

In some examples, coating analyzer 18 is configured to generate initial pigmentation data based on an assumed base number of pigments (e.g., one pigment, two pigments, etc.) forming coating 26. That base number of pigments is an integer that can form the base pigment count. Coating analyzer 18 can generate the initial pigmentation data based on the base pigment count, in that coating analyzer 18 generates a first set of pigmentation data based on an assumption that coating 26 includes the base number of pigments.

In the example shown, coating 26 is classified as including two pigments-first pigment 28a shown in FIG. 2B and second pigment 28 shown in FIG. 2C. As such, the base pigment count is two. In the example shown, first pigment 28a is a red-yellow grouping and second pigment 28b is a green-blue grouping.

Coating analyzer 18 can generate pigment groupings and perform pigment analysis based on the coloration data. Color analyzer 18 can thereby identify and analyze pigments based on color values generated by coating analyzer 18 and applied to each pixel. As such, coating analyzer 18 can generate the groupings and perform pigment analysis based on the evaluated pixels. Coating analyzer 18 can group the evaluated pixels into discrete colors based on the color values of the evaluated pixels. Various colors can be grouped together to define each pigment 28 (e.g., to provide at least a part of the color palette data defining a pigment 28). In some examples, coating analyzer 18 can be configured to generate a color value for each pigment 28 that has been identified by coating analyzer 18. For example, coating analyzer 18 can determine an overall color value (e.g., as a tuple) for the pigment based on the color values of the pixels forming that pigment and the concentrations of those color values. The overall color value of the pigment 28 can be referred to as a determined pigment color value in that the color value is for the pigment 28 as a whole.

Coating analyzer 18 can define the discrete colors and/or each pigment 28 by a clustering algorithm and based on color thresholds. For example, the color threshold can be based on a distance (e.g., Euclidean distance in the color space) between the color values. For example, the distance can be determined based on the square root of the sum of the squares of the numerical values of the tuple providing the color value. In the RGB color model, the formula for determining the Euclidean distance between a first discrete color D1 having values (R1, G1, B1) and a second discrete color D2 having numerical color values (R2, G2, B2) is provided by the following equation:

$$\text{Euclidean Distance} = \sqrt{(R2-R1)^2 + (G2-G1)^2 + (B2-B1)^2} \quad \text{(Equation 1)}$$

Discrete colors can be defined by pixels that are grouped together based on a color threshold (e.g., grouped by the clustering algorithm). Pigments 28 can be defined by discrete colors that are grouped together based on a color threshold. The color threshold (e.g., distance) can be adjusted, such as by the user, to adjust the count of colors forming a pigment 28 and/or to adjust the number of pigments 28 identified as forming the coating 26. In some examples, the color threshold can limit the count of discrete colors for a pigment 28 based on the percentage of the electronic image data occupied by that discrete color, a correlation between the discrete colors, a count of the discrete colors, etc. In some examples, coating analyzer 18 is configured to group each evaluated pixel into one of the identified pigments 28 from the electronic image data.

Pigment 28a is shown in isolation in FIG. 2B. As shown in Table 1 below, pigment 28a is a red-yellow grouping formed by evaluated pixels that have been grouped into discrete colors that form a first color palette having nine significant colors. For example, the color threshold can be set based on a count of the colors (e.g., nine colors in the example shown) such that the nine most prevalent colors forming the first color palette of pigment 28a are identified. In additional or alternate examples, the color threshold can be set at a minimum percentage associated with that color. For example, the color threshold can be set at 1.5% or any other desired percentage. In the example shown, the least prevalent of the significant colors forming first pigment 28a is 1.796518% of the coating 26. The color values of the significant colors and percentage of the coating 26 formed by each significant color are also shown in Table 1. Pigment 28a occupies about 34.661815% of coating 26. The percentage of the coating 26 occupied by pigment 28a can be based on a pixel count, which is a number of pixels forming pigment 28a. In some examples, coating analyzer 18 can be configured to generate a determined pigment color value for pigment 28a, which can be an average color value based on the color values and percentages of the discrete colors of pigment 28a.

TABLE 1

Composition of Pigment 28a

| R | G | B | pct |
|---|---|---|-----|
| 0 | 0 | 0 | 65.338185 |
| 221 | 86 | 45 | 5.423088 |
| 113 | 81 | 59 | 4.885845 |
| 131 | 58 | 37 | 4.745291 |
| 168 | 86 | 52 | 4.404252 |
| 187 | 60 | 38 | 4.037529 |
| 234 | 121 | 50 | 3.829909 |
| 147 | 111 | 80 | 3.514555 |
| 173 | 58 | 78 | 2.024829 |
| 180 | 151 | 79 | 1.796518 |

Pigment 28b is shown in isolation in FIG. 2C. As shown in Table 2 below, pigment 28b is a blue-green grouping formed by evaluated pixels that have been grouped into colors that form a second color grouping with nine significant colors. For example, the color threshold can be set based on a count of the colors (e.g., nine colors in the example shown) such that the nine most prevalent colors forming the second color palette of pigment 28b are identified. In additional or alternate examples, the color threshold can be set at a minimum percentage associated with that color. For example, the color threshold can be set at 1.5% or any other desired percentage. In the example shown, the least prevalent of the significant colors forming first pigment 28b is 2.395833% of the coating 26. The color values of the significant colors and percentage of the coating 26 formed by each significant color are also shown in Table 2. The color palette of pigment 28b forms about 27.699058% of coating 26. The percentage of the coating 26 occupied by pigment 28b can be based a pixel count, which is a number of pixels forming pigment 28b. In some examples, coating analyzer 18 can be configured to generate a color value for pigment 28b, which can be a average color value based on the color values and percentages of the discrete colors of pigment 28b.

TABLE 2

Composition of Pigment 28b

| R | G | B | pct |
|---|---|---|-----|
| 0 | 0 | 0 | 72.300942 |
| 72 | 113 | 73 | 3.911244 |
| 47 | 164 | 172 | 3.567352 |
| 85 | 156 | 121 | 3.462471 |
| 48 | 141 | 131 | 3.168522 |
| 112 | 147 | 84 | 2.996575 |
| 39 | 99 | 112 | 2.874572 |
| 98 | 99 | 104 | 2.716182 |
| 93 | 199 | 175 | 2.606307 |
| 135 | 181 | 116 | 2.395833 |

Coating analyzer 18 generates the color palette data regarding each identified pigment 28a, 28b, as shown in Tables 1 and 2, respectively. Coating analyzer 18 can be configured to identify the pigments 28a, 28b based on the color palette data. Coating analyzer 18 can be operably (e.g., communicatively) connected to reference database 32 (FIG. 1). The reference database 32 can include identifying information regarding various pigments and/or coatings. For example, the reference database 32 can include formula information regarding various coatings, can include pigmentation information regarding various pigments, can identify the relevant color model and color space, etc. It is understood that while the reference database 32 is shown as disposed remote from coating analyzer 18, in some examples the reference data can be stored in memory 22.

Coating analyzer 18 can identify pigments 28 based on the color palette data generated by coating analyzer 18, which color palette data can also be referred to as generated color palette data. For example, coating analyzer 18 can compare the color palette data with reference color palette data. Coating analyzer 18 can be configured to determine a best fit between the evaluated pigment and a reference pigment based on the generated color palette data and the reference color palette data. Coating analyzer 18 can compare the generated color palette data with the reference color palette data from the reference database to determine a fit between the pigment 28 analyzed by coating analyzer 18 and one or more reference pigments. Similarly, coating analyzer 18 can be configured to identify the coating 26 based on the generated color palette data for each pigment 28 forming coating 26. Coating analyzer 18 can compare that pigmentation data to reference pigmentation data from the reference database, which pigmentation data is based on the coating 26 itself whereas the color palette data is based on each pigment 28 forming the coating 26.

Coating analyzer 18 can identify the pigments 28 and/or coating 26 based on a comparison between the combination of pigments in the generated pigmentation data and various combinations of pigments forming various reference coatings. For example, the reference database can include reference data relating to coatings and the pigmentation of those coatings. Coating analyzer 18 can determine fits between the coating 26 and the reference coatings based on the comparison between the generated pigmentation data and the reference pigmentation data. The fits between the generated data and the reference data are representative of a discrepancy or difference between the generated data and reference data. As such, the fits provide a correlation between the generated data and the reference data.

A best fit reference coating and/or best fit reference pigment can be determined by coating analyzer 18 based on a correlation threshold between the generated data and the reference data. The best fit can be a smallest discrepancy between the generated data and the reference data. For example, the best fit can be a smallest distance (e.g., Euclidean distance) between the generated data and the reference data. Coating analyzer 18 can identify the coating 26 and/or each pigment 28a, 28b based on a correlation threshold and the reference data. The correlation between the generated data and the reference data can be quantified based on a percentage match between the identified pigmentation data and the reference pigmentation data. For example, the correlation can be based on a percentage similarity between identified color palette data and reference color palette data, as determined by coating analyzer 18. The correlation between the generated data and the reference data can be quantified based on distances between the identified and reference color values within a color space (e.g., Euclidean distances).

The correlation between the generated data and the reference data can be quantified based on a difference between weighted component parts, among other criteria. For example, a first pigment forming a first percentage of the coating of interest can be assigned a greater relative value when determining a fit between coating 26 and a reference coating than a value assigned to a second pigment forming a second percentage less than the first percentage. In the example shown, pigment 28a covers a greater area of coating 26 than pigment 28b such that a close correlation between pigment 28a and a first reference pigment is given a greater weight in the coating evaluation than a similarly close correlation between pigment 28b and a second reference pigment. It is understood, however, that the correlation between the generated data and the reference data can be quantified in any desired manner.

Coating analyzer 18 can be configured to identify the coating 26 and/or pigments 28 based on the best fit between the data generated by coating analyzer 18 and the reference data. In some examples, coating analyzer 18 can be configured to iteratively generate data to identify the pigments 28 and/or coating 26. For example, coating analyzer 18 can generate a first fit based on the generated data and the reference data to determine an initial correlation. Coating analyzer 18 can execute one or more subsequent analyses to generate additional fits. In some examples, the subsequent classifications can be based on data generated by coating analyzer 18 based on different base pigment counts or other variable changes relative to the data generated and utilized for the first fit. For example, a second fit can be based on data generated based on coating 26 being assumed to include a third pigment in addition to pigments 28a, 28b; a third fit can be based on pigmentation data generated based on coating being assumed to include a fourth pigment; etc.

Coating analyzer 18 can be configured to iteratively generate data until a best fit is determined. The best fit can be based on the correlation threshold. For example, the correlation threshold can be a percentage match between the generated pigmentation information and the reference pigmentation information, such as 95-percent similar, 98-percent similar, or any other desired correlation; the correlation threshold can be based on an iteration count, such that coating analyzer 18 performs a set number of fit iterations and the best fit data is selected from that finite data set; the correlation threshold can be based on a point of diminishing returns, which is a point beyond which the fit determined by coating analyzer 18 between the generated and reference data improves by less than a return threshold, such as less than a 1-percent change between fits; among any other desired thresholds.

Coating analyzer 18 can be configured to generate the pigmentation data based on source data regarding coating 26. For example, coating analyzer 18 can be configured to apply a stricter correlation threshold for a first coating having a first application as compared to a second coating having a second application. For example, coating analyzer 18 can apply a stricter correlation threshold (e.g., 98-percent correlation) for a vehicle paint compared to a second correlation threshold (e.g., 95-percent) for a paint in an interior storage space.

Coating analyzer 18 generates pigmentation data and can output that pigmentation data as pigmentation information. For example, coating analyzer 18 can generate and output the color palette data and/or the best fit data as the pigmentation information, among other data. The pigmentation information can include information regarding one or more reference coatings and/or reference pigments that are correlated with coating 26 and/or pigments 28a, 28b.

Coating analyzer 18 is configured to generate pigmentation information regarding coating 26 based on the single electronic image generated by image-capture device 16. Coating analyzer 18 is configured to automatically identify discrete colors based on groupings evaluated pixels and to identify pigments formed by those discrete colors based on only the image data contained in the electronic image. For each pigment 28, coating analyzer 18 determines the percentage or concentration of the electronic image data formed by that pigment 28. Coating analyzer 18 can identify one or more respective pigments 28 forming the coating 26. Coating analyzer 18 can reference one or more reference databases 32 to replicate coating 26 based on the identified color palette data and the reference color palette data for known pigments. Such direct identification allows the user to generate a visually identical coating. Coating analyzer 18 can, in some examples, identify one or more reference coatings that correspond to coating 26 based on a comparison between the generated pigmentation data and the reference pigmentation data, such as in examples where more than one reference coating has a fit that exceeds the correlation threshold.

Coating analyzer 18 facilitates coating and pigment analysis and identification. Coating analyzer 18 can generate identification information in a small fraction of the time currently required in color analysis. Current technologies require a highly trained expert to identify and quantify pigment concentrations within a coating. Coating analyzer 18 further reduces the skill required to identify and quantify pigment concentrations and can be utilized by a novice to produce nearly instantaneous results. By employing the software solution of the present disclosure, novice users with very little training are able to use the system to identify and quantify concentrations of pigments in a paint sample nearly instantaneously. This is a significant improvement over existing technologies, which require weeks or months for the highly trained expert to successfully perform such a task.

Coating analyzer 18 can accurately and efficiently identify the pigments 28 and/or the coating 26 based on the single electronic image. Coating analyzer 18 generates accurate information across a broad range of paints and coating types, including those with metallic chips and other particulate. Coating analyzer 18 thereby facilitates quicker paint replication and blending and allows for painting jobs to be completed more efficiently and in a more timely manner. Coating analyzer 18 provides identifying information for the pigments and/or coating such that the user does not have to blend multiple test paints and compare each of those test blends to the actual coating to get a workable mix. Instead, the coating analyzer 18 provides the pigment formula for the coating 26, allowing the user to work more efficiently because the user does not have to generate multiple test batches and allow those samples to dry to compare with the coating of interest. In addition, less waste is generated by the reduced testing and mixing required to get to a desired paint mix. Coating analyzer 18 further facilitates operation by novice technicians by providing an accurate coating formula. Coating analyzer 18 can improve technician training by quickly identifying the desired formulas and by providing a composition level analysis to blends generated by the technician. For example, technicians can blend a test mix and utilize coating analyzer 18 to perform a comparison between the test mix and the coating of interest.

In some examples, coating analyzer 18 can generate comparison information between the coating of interest and a test replica coating. The test replica coating can be a coating blend generated by a technician. The coating analyzer 18 can generate first pigmentation information for the coating of interest and can generate second pigmentation information for the test replica coating. Coating analyzer 18 can generate comparison information, such as a fit between the data generated for the test coating and the data generated for the coating of interest, and provide that information to the technician, thereby providing direct feedback on the mix to the technician and allowing for direct feedback to enhance training of technicians. Coating analyzer 18 can thus provide direct feedback to the user regarding a fit between the formula of the test replica coating and the formula of the coating of interest.

Coating analyzer 18 can, in some examples, be configured to write the generated coating information to one or more reference databases, such as reference database 32. For example, coating analyzer 18 can build a database or supplement the reference database based on pigmentation data, color palette data, and/or other data generated by coating analyzer 18 during operation. For example, coatings can fade over time (e.g., due to weathering) such that first pigmentation data generated by coating analyzer 18 for a first coating when the first coating is new may differ from second pigmentation data generated by coating analyzer 18 for the first coating when the first coating has been aged for ten, twenty, fifty or another number of years. Coating analyzer 18 can write the generated pigmentation data to the database as associated with a reference coating representative of the first coating based on the historical information regarding the coating. For example, coating analyzer 18 can be provided with relevant historical information regarding the coating (e.g., the original manufacturer, the age, the date of application, the environmental storage conditions, etc.) and can then write the generated pigmentation data to the database as associated with that reference coating, which can be utilized in subsequent analyses.

CIR system 10 facilitates quick and efficient identification of coatings by automatically identifying the component parts of the coating. CIR system 10 can identify pigments and their concentrations based on electronic image data. Coating analyzer 18 can generate one or more best fit recipes for the coating 26. CIR system 10 facilitates quick replication of the paint and allows the user to receive replacement paint quickly and efficiently without having to wait weeks or months for an analysis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method of identifying components of a coating of interest, the method comprising:
   obtaining electronic image data of the physical coating;
   identifying, by a coating analyzer, one or more pigments of the physical coating based on the electronic image data;
   generating, by the coating analyzer, first color palette data for a first pigment of the one or more pigments;
   comparing, by the coating analyzer, the first color palette data with reference color palette data;
   correlating, by the coating analyzer, the first pigment of the one or more pigments with a first reference pigment based on the comparison between the first color palette data and the reference color palette data to generate first pigmentation information regarding the first pigment of the one or more pigments.

2. The method of claim 1, further comprising:
 generating, by the coating analyzer, respective color palette data for each respective pigment of the one or more pigments;
 comparing, by the coating analyzer, the respective color palette data with the reference color palette data; and
 correlating, by the coating analyzer, each pigment of the one or more pigments with a respective reference pigment based on the comparison between the respective color palette data and the reference color palette data to generate pigmentation information regarding each pigment of the one or more pigments.

3. The method of claim 1, wherein identifying, by the coating analyzer, one or more pigments of the physical coating based on the electronic image data includes:
 assigning, by the coating analyzer, color values to pixels of the electronic image data to generate evaluated pixels; and
 grouping, by the coating analyzer, the evaluated pixels into one or more pigment clusters.

4. The method of claim 2, wherein grouping, by the coating analyzer, the evaluated pixels into the one or more pigment clusters comprises:
 grouping sets of the evaluated pixels into a plurality of color clusters, each color cluster of the plurality of color clusters representing a discrete color of the physical coating; and
 grouping relevant color clusters of the plurality of color clusters together to form the pigment clusters.

5. The method of claim 3, wherein assigning, by the coating analyzer, color values to pixels of the electronic image data to generate evaluated pixels includes assigning color values in as a triple numerical set.

6. The method of claim 3, wherein assigning, by the coating analyzer, color values to pixels of the electronic image data to generate evaluated pixels includes assigning color values in as a quadruple numerical set.

7. The method of claim 3, wherein identifying, by the coating analyzer, one or more pigments of the physical coating based on the electronic image data further comprises:
 identifying, by the coating analyzer, a percentage of the electronic image data occupied by the one pigment of the one or more pigments based on a respective pigment cluster of the one or more pigment clusters;
 quantifying, by the coating analyzer, an amount of the physical coating formed by the one pigment of the one or more pigments based on the percentage of the electronic image data occupied by the one pigment of the one or more pigments.

8. The method of claim 1, wherein comparing, by the coating analyzer, the respective color palette data with the reference color palette data recalled from the database comprises:
 determining, by the coating analyzer, a distance between a determined pigment color value based on the respective color palette data and a reference pigment color value based on the first color palette data within a color space.

9. The method of claim 8, wherein:
 determining, by the coating analyzer, the distance between the determined pigment color value based on the respective color palette data and the reference pigment color value based on the first color palette data within the color space includes determining a Euclidean distance within the color space.

10. The method of claim 1, further comprising:
 recalling the respective reference pigment from an electronic database.

11. The method of claim 1, wherein correlating, by the coating analyzer, the first pigment of the one or more pigments with the first reference pigment based on the comparison between the first color palette data and the reference color palette data to generate the first pigmentation information regarding the first pigment of the one or more pigments includes:
 determining, by the coating analyzer, a plurality of fits between the first pigment and a plurality of reference pigments recalled from the database.

12. The method of claim 11, further comprising:
 outputting, by the coating analyzer, the generated first pigmentation information based on a best fit of the plurality of fits between the first pigment and the plurality of reference pigments recalled from the database.

13. The method of claim 1, wherein obtaining the electronic image data of the physical coating includes capturing an image with an image-capture device configured to generate the electronic image data.

14. The method of claim 1, wherein generating, by the coating analyzer, the first color palette data includes determining percentage concentrations of discrete colors within the first pigment.

15. The method of claim 1, further comprising:
 outputting, by the coating analyzer, the generated pigmentation information.

16. The method of claim 2, further comprising:
 mixing a paint based on the generated pigmentation information by combining pigments with a paint base according to pigment ratios determined by the coating analyzer.

17. A method of mixing a coating of interest, the method comprising:
 obtaining electronic image data of the physical coating;
 identifying, by a coating analyzer, one or more pigments of the physical coating based on the electronic image data;
 generating, by the coating analyzer, respective color palette data for each pigment of the one or more pigments;
 comparing, by the coating analyzer, the respective color palette data with reference color palette data;
 generating, by the coating analyzer, pigmentation information regarding each pigment of the one or more pigments; and
 combining, by the coating mixer, a plurality of pigments within a coating base to form a mixed coating based on the generated pigmentation information.

18. The method of claim 17, wherein combining, by the coating mixer, a mixed coating includes releasing sources of pigment connected to the coating mixer into a paint base that forms the coating base.

19. The method of claim 17, wherein obtaining electronic image data of the physical coating includes capturing an image with an image-capture device configured to generate the electronic image data.

20. The method of claim 19, further comprising:
 obtaining, by the image-capture device, mixed coating electronic image data of the mixed coating;
 identifying, by the coating analyzer, one or more pigments of the mixed coating based on the mixed coating electronic image data;

generating, by the coating analyzer, respective mixed color palette data for each pigment of the one or more pigments of the mixed coating;

generating, by the coating analyzer, mixed coating pigmentation information regarding each pigment of the one or more pigments of the mixed coating;

comparing, by the coating analyzer, the pigmentation information and the mixed coating pigmentation information; and outputting, by the coating analyzer, the comparison between the pigmentation information and the mixed coating pigmentation information.

* * * * *